(12) United States Patent
Ban et al.

(10) Patent No.: US 7,048,044 B2
(45) Date of Patent: May 23, 2006

(54) HEAT CONTROL SYSTEM (75) Inventors: Koichi Ban, Toukai (JP); Yasushi Yamanaka, Nakashima-gun (JP); Takahisa Suzuki, Nagoya (JP); Teruhiko Kameoka, Okazaki (JP)

(73) Assignee: DENSO Corporation, Kariya (JP)

( * ) Notice: Subject to any disclaimer, the term of this patent is extended or adjusted under 35 U.S.C. 154(b) by 45 days.

(21) Appl. No.: 10/797,691

(22) Filed: Mar. 9, 2004

(65) Prior Publication Data

US 2004/0194949 A1    Oct. 7, 2004

(30) Foreign Application Priority Data

Mar. 10, 2003  (JP)  .............................. 2003-062897

(51) Int. Cl.
*F25B 29/00* (2006.01)
*B60H 1/00* (2006.01)

(52) U.S. Cl. .......................... 165/202; 165/42; 165/43; 165/240; 62/238.6; 62/196.4; 62/323.1; 237/2 B (58) Field of Classification Search ................ 165/202, 165/42, 43, 240, 241, 242; 62/238.6, 196.4, 62/323.1; 237/2 B
See application file for complete search history.

(56) References Cited

U.S. PATENT DOCUMENTS

| 6,047,770 | A  | * | 4/2000 | Suzuki et al. | ................ | 165/202 |
| 6,543,531 | B1 | * | 4/2003 | Casar et al. | ................. | 165/202 |
| 6,913,067 | B1 | * | 7/2005 | Hesse | .......................... | 165/202 |
| 2003/0010488 | A1 | * | 1/2003 | Watanabe et al. | ........... | 165/202 |

FOREIGN PATENT DOCUMENTS

| JP | 11-286211 | 10/1999 |
| JP | 2002-516595 | 6/2002 |

* cited by examiner

*Primary Examiner*—John K. Ford
(74) *Attorney, Agent, or Firm*—Harness, Dickey & Pierce, PLC (57) ABSTRACT There are provided a water-refrigerant heat exchanger 30 for exchanging heat between refrigerant discharged from a compressor 21 and engine-cooling water circulating an engine-cooling water circuit 10, prior to being fed into the radiator 22, and a bypass 25 for guiding the refrigerant prior to being fed into the evaporator 24 to the water-coolant heat exchanger 30 while bypassing the evaporator 24 and the compressor 21. When it is desired to accelerate the warming-up of the engine 11, the bypass 25 is closed to operate the compressor 21 to heat the engine-cooling water by high-pressure refrigerant, and when it is desired to complement the capacity of the radiator 12, the bypass 25 is open to guide the liquid-phase refrigerant to the water-refrigerant heat exchanger 30 to effectively cool the refrigerant by using the phase change of the refrigerant.

6 Claims, 7 Drawing Sheets

HEAT CONTROL SYSTEM

BACKGROUND OF THE INVENTION

1. Field of the Invention

The present invention relates to a heat control system, including a heat generator such as a heat engine, in which heat is generated during driving and a temperature must be maintained within a predetermined range, and a vapor compression type refrigerator, which is effectively applicable to a vehicle mounting an internal combustion engine.

2. Description of the Related Art

In the prior art, heat exchange between engine-cooling water and air to be blown into a passenger compartment is carried out in a heater, which air is then cooled by an evaporator of a vapor compression type refrigerator. The engine-cooling water flowing into the heater is heated by high-pressure refrigerant in the vapor compression type refrigerator so that the heating capacity is complemented and, on the other hand, part of the heat absorbed into the refrigerant by the heat exchange between the engine-cooling water and the refrigerant is radiated from a radiator for the engine-cooling water into outer air so that the cooling capacity is complemented (see, for example, Japanese Unexamined Patent Publication No. 11-286211).

In this regard, as two heat exchangers; a heat exchanger for the heat-exchange between the engine-cooling water and the refrigerant for the purpose of complementing the heating capacity, and an auxiliary heat exchanger for the heat-exchange between the engine-cooling water and the refrigerant for the purpose of complementing the cooling capacity; are used in the invention described in Japanese Unexamined Patent Publication No. 11-286211, it is difficult to reduce the production cost for the heat control system.

Also, in the invention described in Japanese Unexamined Patent Publication No. 11-286211, as waste heat generated in the vapor compression type refrigerator (an air conditioner) is used solely for the purpose of complementing the heat capacity, and during the cooling, is discharged into outer air via the auxiliary heat exchanger and the radiator, it could hardly be said that the waste heat is effectively used.

SUMMARY OF THE INVENTION

An object of the present invention is to provide a novel heat control system free from the above-mentioned drawbacks of the prior art, and another object is to effectively use waste heat.

To achieve the above objects, according to one aspect of the present invention, a heat control system is provided, comprising a heat generator (11) in which heat is generated during operating the heat generator and a temperature is necessarily maintained in a predetermined range, a vapor compression type refrigerator having a compressor (21), a radiator (22), an evaporator (24) and a pressure reducing means (23) to transfer heat from the lower temperature side to the higher temperature side, a heat exchanger (30) for exchanging heat between refrigerant discharged from the compressor (21) and prior to being fed into the radiator (22) and medium for exchanging heat from the heat generator (11), and a bypass (25) for guiding the refrigerant prior to being fed into the evaporator (24) to the heat exchanger (30) while detouring the evaporator (24) and the compressor (21), wherein the system operates in a heating mode for heating the medium with the high-temperature refrigerant discharged from the compressor (21), and a heat dissipation mode for cooling the medium with the refrigerant and dissipating heat absorbed from the medium via the radiator (22), and during the heat dissipation mode, at least part of the refrigerant flowing out from the radiator (22) is made to pass through the bypass (25).

Thereby, as heat is exchanged between the heat generator (11) and the vapor compression type refrigerator in the heat exchanger (30), it is possible to reduce the production cost of the heat control system.

Also, as the heat generator (11) is heated by the waste heat imparted by the vapor compression type refrigerator in addition to heat generated by itself, it is possible to shorten the warming-up time in comparison with a case in which the warming-up operation is carried out solely by heat generated by itself.

According to the present invention, preferably, the bypass (25) mainly guides a liquid-phase component of the refrigerant prior to being fed into the evaporator (24) to the heat exchanger (30).

Thereby, as the liquid-phase refrigerant can be evaporated in the heat exchanger (30), it is possible to collect the waste heat of the heat generator (11) as evaporation latent heat and discharge the same as condensation heat. That is, the waste heat of the heat generator (11) is effectively collected and discharged.

According to the present invention, the bypass (25) preferably guides the refrigerant discharged from the radiator (22) to the heat exchanger (30) prior to being decompressed by the pressure reducing means (23).

Thereby, as the liquid-phase refrigerant is mainly fed to the heat exchanger (30), it is possible to effectively collect the waste heat from the heat generator (11) and discharge it.

According to another aspect of the present invention, a heat control system is provided, comprising a heat generator (11) in which heat is generated during operating the heat generator and a temperature is necessarily maintained in a predetermined range, a vapor compression type refrigerator having a compressor (21), a radiator (22), an evaporator (24) and a pressure reducing means (23) to transfer heat from the lower temperature side to the higher temperature side, a heat exchanger (30) for exchanging heat between refrigerant discharged from the compressor (21) and prior to being fed into the radiator (22) and medium for exchanging heat from the heat generator (30), and a cooler (26) for cooling the refrigerant fed into the heat exchanger (30), wherein the system operates in a heating mode for heating the medium with the high-temperature refrigerant discharged from the compressor (21), and a heat dissipation mode for cooling the medium with the refrigerant and dissipating heat absorbed from the medium via the radiator (22).

Thereby, as the heat is exchanged between the heat generator (11) and the vapor compression type refrigerator in the heat exchanger (30), it is possible to reduce the production cost of the heat control system.

Also, as the heat generator (11) is heated by the waste heat imparted from the vapor compression type refrigerator in addition to that generated by itself, it is possible to shorten the warming-up time in comparison with a case in which the warming-up is carried out solely by the heat generated by itself.

Also, as the refrigerant fed into the heat exchanger (30) is cooled, it is possible to increase the heat-exchanging rate in the heat exchanger (30) during the heat dissipation mode.

Also, as the refrigerant fed into the heat exchanger (30) is condensed by cooling the refrigerant, it is possible to feed the liquid-phase refrigerant into the heat exchanger (30) to effectively collect the waste heat of the heat generator (11) and discharge it.

According to the present invention, the system further comprises means (31) for controlling the heat exchange between the medium and the refrigerant in the heat exchanger (30).

According to the present invention, preferably, the means (31) for controlling the heat exchange operates in the heating mode when the temperature of the heat generator (11) is lower than a first predetermined temperature, operates in the heat dissipation mode when the temperature of the heat generator (11) is at a second predetermined temperature above the first predetermined temperature or higher, and operates in a normal mode when the temperature of the heat generator (11) is within a range from the first predetermined temperature to the second predetermined temperature, in which the heat exchange between the medium and the refrigerant is made to stop.

According to the present invention, the heat generator (11) is preferably a heat engine.

In this regard, the reference numerals of the respective means in bracket examples showing the relationship with concrete means described in the embodiments described later.

The present invention may be more fully understood from the description of the preferred embodiments of the invention, as set forth below, together with the accompanying drawings.

DESCRIPTION OF THE PREFERRED EMBODIMENTS

First Embodiment

Figure 1:
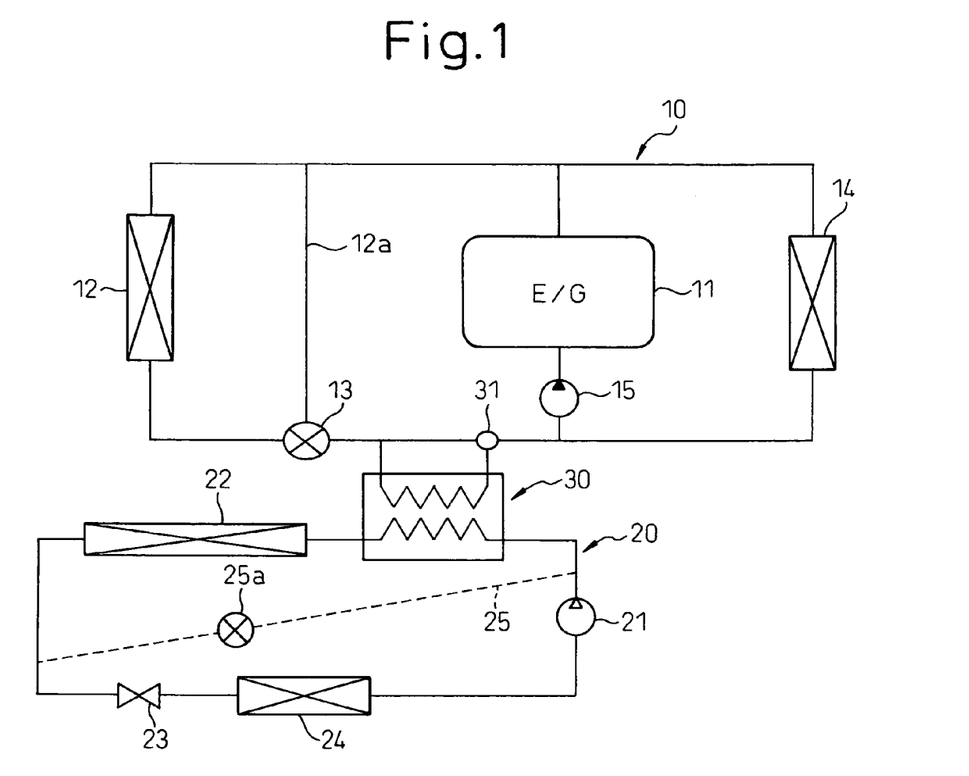
FIG. 1 is a schematic illustration of a heat control system for a vehicle according to a first embodiment of the present invention.

In this embodiment, the present invention is applied to a vehicle mounting an internal combustion engine, wherein FIG. 1 is a schematic illustration of a heat control system for a vehicle according to this embodiment.

An engine 11 is a heat generator for generating a power for driving a vehicle, and a radiator 12 is a heat exchanger for cooling engine-cooling water by the heat-exchange between the engine-cooling water flowing out from the engine 11 and outer air.

A thermostat 13 is a flow control valve for regulating a flow rate of the engine-cooling water fed to the radiator 12 by regulating a flow rate of the engine-cooling water passing through a bypass 12a for returning the engine-cooling water flowing out from the engine 11 thereto while detouring the radiator 12. Thus, a temperature controlling device is structured by the thermostat 13 and the radiator 12, for maintaining a temperature of the engine 11, that is, a temperature of the engine-cooling water within a predetermined range (for example, from 80 to 110° C.).

A heater 14 is a heating means for heating air fed into a passenger compartment, while using waste heat of the engine 11 as a heat source, and an engine-cooling water circuit 10 is structured by the engine 11, the radiator 12, the thermostat 13 and the heater 14. In this regard, a pump 15 is used for circulating the engine-cooling water, which operates based on a power obtained from the engine 11 in this embodiment.

A compressor 21 is used for sucking and compressing the refrigerant, which operates based on a power obtained from the engine 11 via a power-transmission device for intermittently transmitting the power, such as a magnetic clutch in this embodiment.

A radiator 22 is a high-pressure side heat exchanger for cooling the high-temperature refrigerant discharged from the compressor 21 by the heat-exchange between the refrigerant and outer air. In this embodiment, as chlorofluorocarbon (R134a) is used as refrigerant, the refrigerant is cooled and condensed in the radiator 22 to reduce the enthalpy thereof.

In this regard, when carbon dioxide or the like is used as refrigerant and the discharging pressure of the compressor 21 is higher than the critical pressure, the refrigerant is not condensed in the radiator 22 but the temperature is lowered to reduce the enthalpy thereof.

A pressure reducer 23 is means for decompressing high-pressure refrigerant discharged from the radiator 22, and in this embodiment, a so-called thermostatic expansion valve is adopted, for controlling an opening degree of a throttle so that an overheating degree of the refrigerant is maintained at a predetermined value.

An evaporator 24 is a low-pressure side heat exchanger for exchanging heat between the decompressed low pressure refrigerant and air blown into the passenger compartment and evaporating liquid-phase refrigerant. By this evaporator 24, air blown into the passenger compartment is cooled. Thus, the compressor 21, the radiator 22, the evaporator 22 and the pressure reducer 23 structure a vapor compression type refrigerator 20, for transferring heat from the lower-temperature side to the higher-temperature side.

A water-refrigerant heat exchanger 30 is a heat exchanger for exchanging heat between the refrigerant discharged from the compressor prior to being fed into the radiator and the engine-cooling water circulating the engine-cooling water circuit and, in this embodiment, an engine-cooling water entrance side of the water-refrigerant heat exchanger 30 is coupled to the bypass 12a in the engine-cooling water circuit 10 and an engine-cooling water outlet side of the water-refrigerant heat exchanger 30 is coupled to an engine-cooling water inlet side of the water-refrigerant heat exchanger 30.

A directional selecting valve 31 is means for controlling a heat-exchanging rate between the engine-cooling water and the refrigerant in the water-refrigerant heat exchanger 30 by regulating an amount of the engine-cooling water fed to the water-refrigerant heat exchanger 30, and the operation of the directional selecting valve 31 is controlled by an electronic controller (not shown) based on the temperature of the engine 11; that is, the temperature of the engine-cooling water discharged from the engine 11.

A bypass 25 is a passage for guiding the refrigerant, prior to being fed into the evaporator 24, to the water-refrigerant heat exchanger 30 while bypassing the evaporator 24 and the compressor 21, and a bypass valve 25a is a valve for controlling the bypass 25 and is controlled by the electronic controller to be cooperative with the directional selecting valve 31.

Next, a characteristic operation mode and effect of the vehicle heat control system according to this embodiment will be described below.

1. Heating Mode (Starting Mode)

This mode is carried out when the temperature of the engine 11, that is, the temperature Tw of the engine-cooling water discharged from the engine 11 is lower than a first predetermined temperature (for example, 70° C.); i.e., when the temperature of the engine 11 is lower than the lower limit and the warming-up of the engine is necessary.

Figure 2:
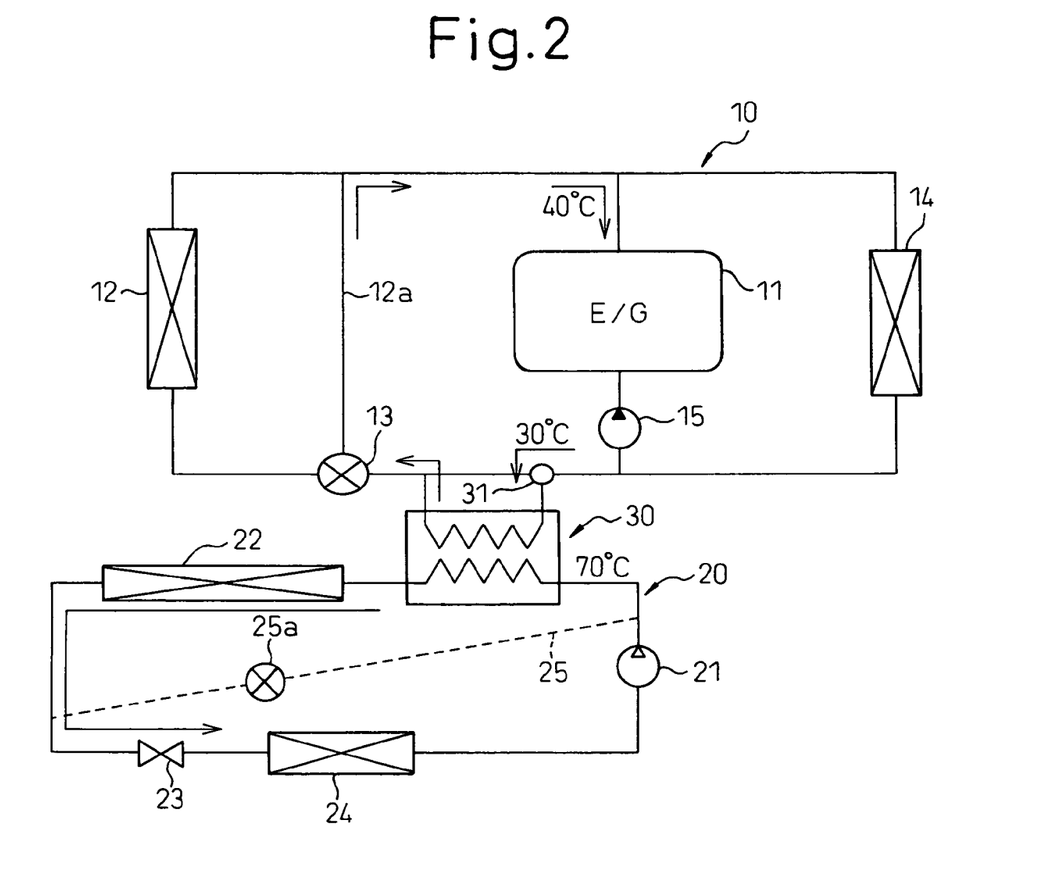
FIG. 2 is a schematic illustration for explaining the operation of the heat control system for a vehicle in a heating mode.

Concretely, the compressor 21 is operated while circulating the cooling water through the water-refrigerant heat exchanger 30 under the condition that the bypass valve 25a is closed. Thereby, as shown in FIG. 2, as the refrigerant discharged from the compressor 21 circulates in the water-refrigerant heat exchanger 30→the radiator 32→the pressure reducer 23→the evaporator 24→the compressor 21, heat in the hot refrigerant discharged from the compressor 21 is imparted to the engine-cooling water.

Accordingly, as the engine 11 is heated by the waste heat imparted from the vapor compression type refrigerator 20 in addition to heat it generates itself, it is possible to shorten the warming-up time in comparison with a case in which the warming-up is carried out solely with heat generated from itself.

As the refrigerant is intermittently compressed in the compressor 21, the temperature of the refrigerant discharged from the compressor 21 becomes high (for example, in a range from 60 to 70° C.) substantially at the same time as the compressor 21 has started. Thereby, it is possible to certainly heat the engine-cooling water with the refrigerant discharged from the compressor 21 even immediately after the engine 11 has started, that is, immediately after the compressor 21 has started.

In this regard, as the endothermic operation occurs in the evaporator 24, the heating mode is realized by the operation of the air-conditioner, of course, in a summer season necessitating the cooling, as well as in a winter season necessitating the dehumidified air-conditioning.

2. Heat dissipation Mode (Cooling-Assist Mode)

This mode is executed when the temperature Tw of the engine-cooling water is higher than a second predetermined temperature (for example, 108° C.) which is higher than the upper limit of the first temperature range, that is, when the temperature of the engine 11 exceeds the upper limit of the above-mentioned temperature range and there is a risk in that it is difficult to cool the engine 11 solely by the radiator 12.

Figure 3:
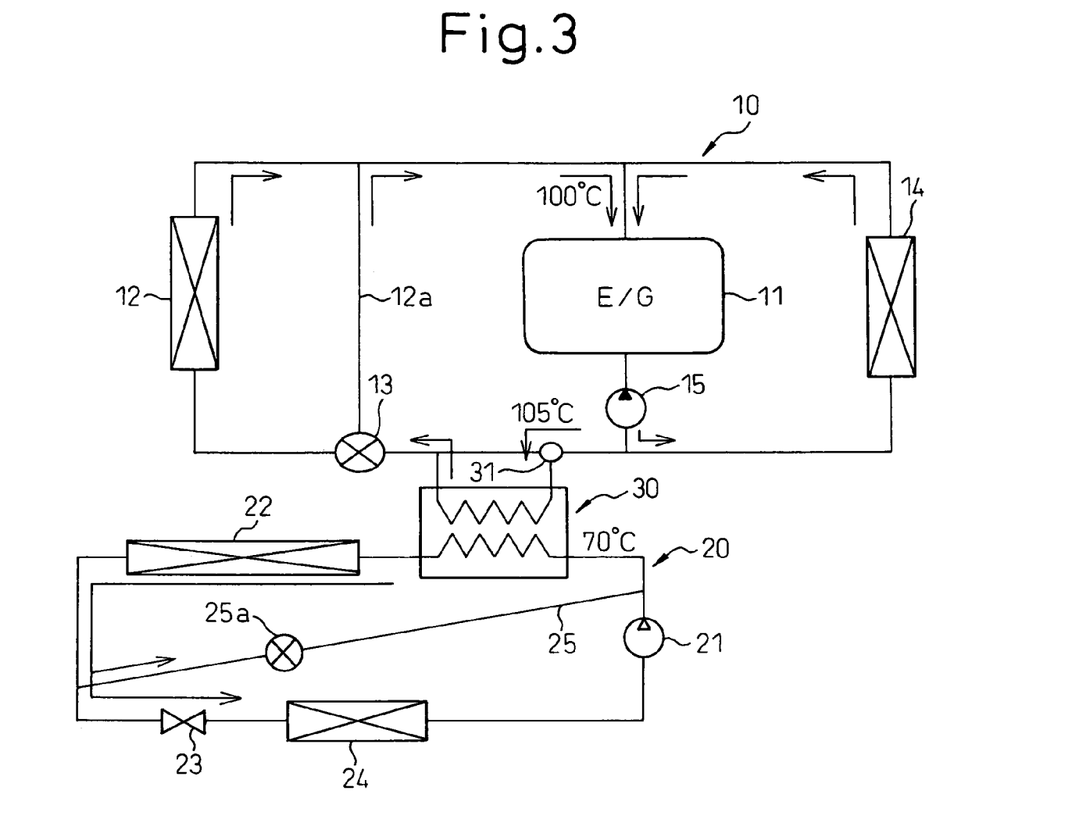
FIG. 3 is a schematic illustration for explaining the operation of the heat control system for a vehicle in a heat dissipation mode.

Concretely, the compressor 21 is operated under the condition that the bypass valve 25a is opened to circulate the cooling water through the water-refrigerant heat exchanger 30. Thereby, as shown in FIG. 3, the refrigerant discharged from the compressor 21 circulates in the water-refrigerant heat exchanger 30→the radiator 22→the pressure reducer 23→the evaporator 24→the compressor 21, and the refrigerant branched through the bypass 25 is sucked into a refrigerant flow discharged from the compressor 21 to circulate through the water-refrigerant heat exchanger 30→the radiator 22→the water-refrigerant heat exchanger 30.

Accordingly, heat imparted to the refrigerant from the engine-cooling water in the water-refrigerant heat exchanger 30 is discharged to the outer air from the radiator 22 together with heat absorbed by the evaporator 24.

Thereby, as the cooling capacity of the radiator 12 is can be complemented by the radiator 22, it is possible to be minimize the radiator 12 in size without lowering the cooling capacity.

Also, as the radiator 22 is disposed upstream of the radiator 12 as seen in the flowing direction of the cooling air flow, the temperature difference between the refrigerant heated by the engine-cooling water and the outer air (cooling air) becomes larger to effectively cool the engine; i.e., the engine-cooling water.

Also, according to this embodiment, as the bypass 25 is coupled to the upstream of the pressure reducer 23 as seen in the refrigerant-flowing direction, it is possible to supply the liquid-phase refrigerant mainly by the bypass 25 to the water-refrigerant heat exchanger 30.

Accordingly, as it is possible to evaporate the liquid-phase refrigerant in the water-refrigerant heat exchanger 30, the waste heat of the engine 11 can be collected and discharged as an evaporation latent heat. Thereby, it is possible to collect the waste heat of the engine 11 and discharge the same therefrom.

3. Normal Mode

Figure 4:
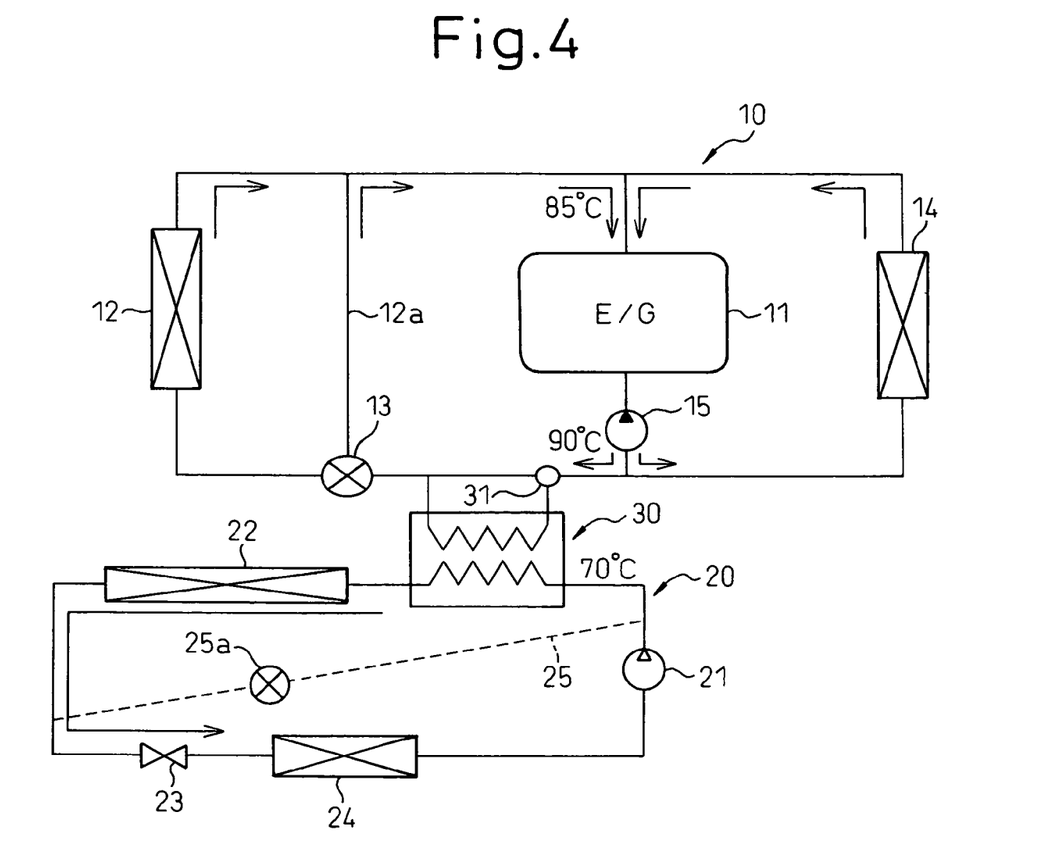
FIG. 4 is a schematic illustration for explaining the operation of the heat control system for a vehicle in a normal mode.

This mode is executed when the temperature Tw of the engine-cooling water is in a range from the first predetermined temperature Tw to the second predetermined temperature; that is, when the engine 11 is within the above-mentioned temperature range. Concretely, the compressor 21 is operated without circulating the cooling water through the water-refrigerant heat exchanger 30, while closing the bypass valve 25a.

Thereby, as shown in FIG. 4, the refrigerant discharged from the compressor 21 cools air fed into the passenger compartment, while circulating in series of the water-refrigerant heat exchanger 30→the radiator 22→the pressure reducer 23→the evaporator 24→the compressor 21, and the engine-cooling water circuit 10 and the vapor compression type refrigerator 20 are thermally separated from each other.

Figure 5:
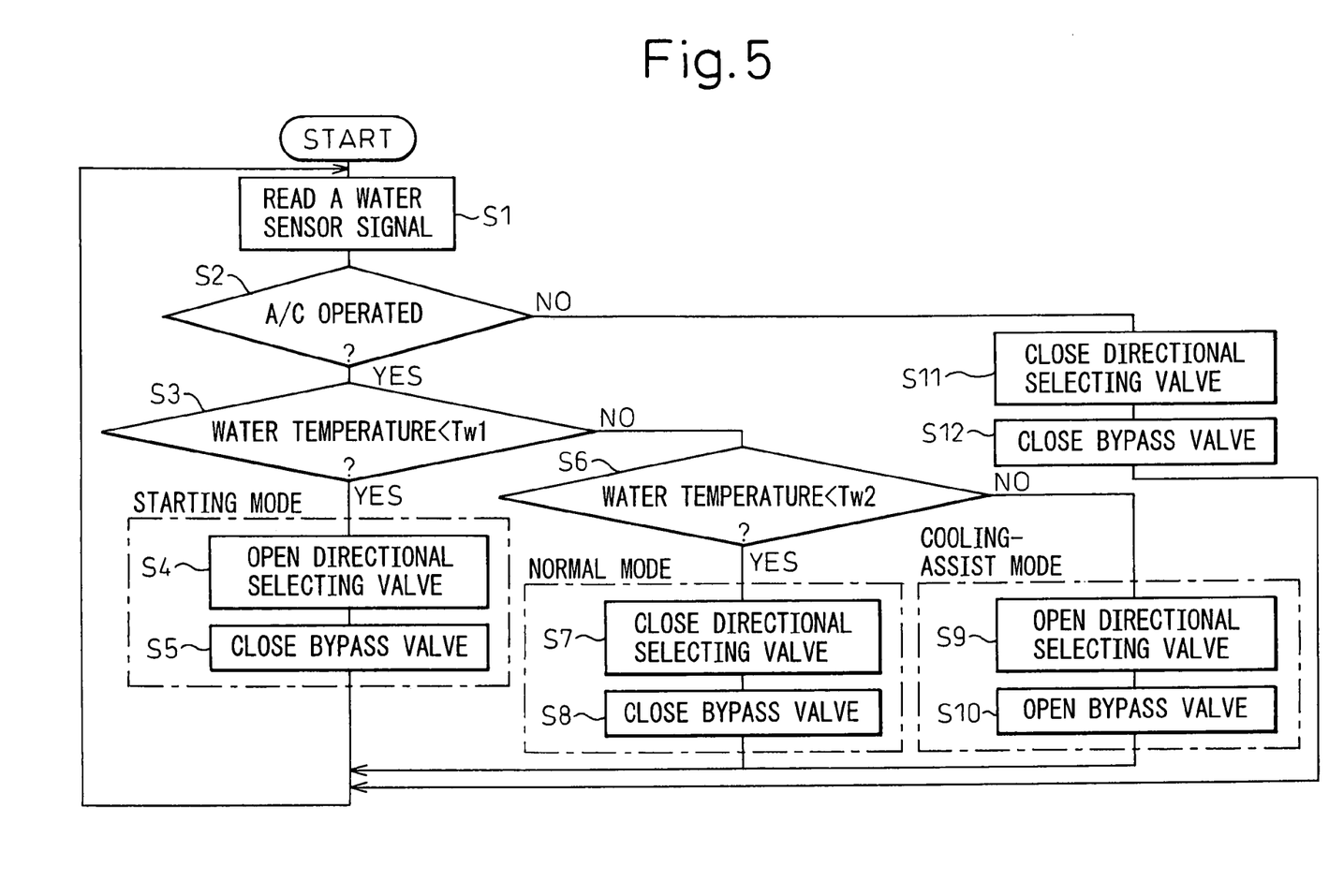
FIG. 5 is a flow chart illustrating the operation of the heat control system for a vehicle.

Next, the operation of this embodiment will be described based on a flow chart shown in FIG. 5.

When the engine 11 starts, the temperature of the engine 11; that is, the temperature Tw of the engine-cooling water discharged from the engine 11; is read, and simultaneously therewith, it is determined whether or not a starting switch of the air-conditioner (the vapor compression type refrigerator 20) is ON; that is, whether or not the vapor compression type refrigerator 20 (the compressor 21) is in an operable state (S1, S2). If the starting switch is ON, it is determined whether or not the temperature Tw is lower than the first predetermined temperature. If the temperature Tw is lower than the first predetermined temperature Tw, the heating mode (starting mode) is executed (S4, S5).

When the temperature Tw is within a range from the first temperature to the second temperature, the normal mode is executed (S6 to S8) and, when the temperature Tw is lower than the second predetermined temperature, the heat dissipation mode (cooling-assist mode) is executed (S9, S10).

In this regard, when the starting switch is OFF, the bypass valve 25a is closed to stop the circulation of the cooling water through the water-refrigerant heat exchanger 30 (S11, S12) so that the engine-cooling water circuit 10 is thermally separated from the vapor compression type refrigerator 20.

Second Embodiment

Figure 6:
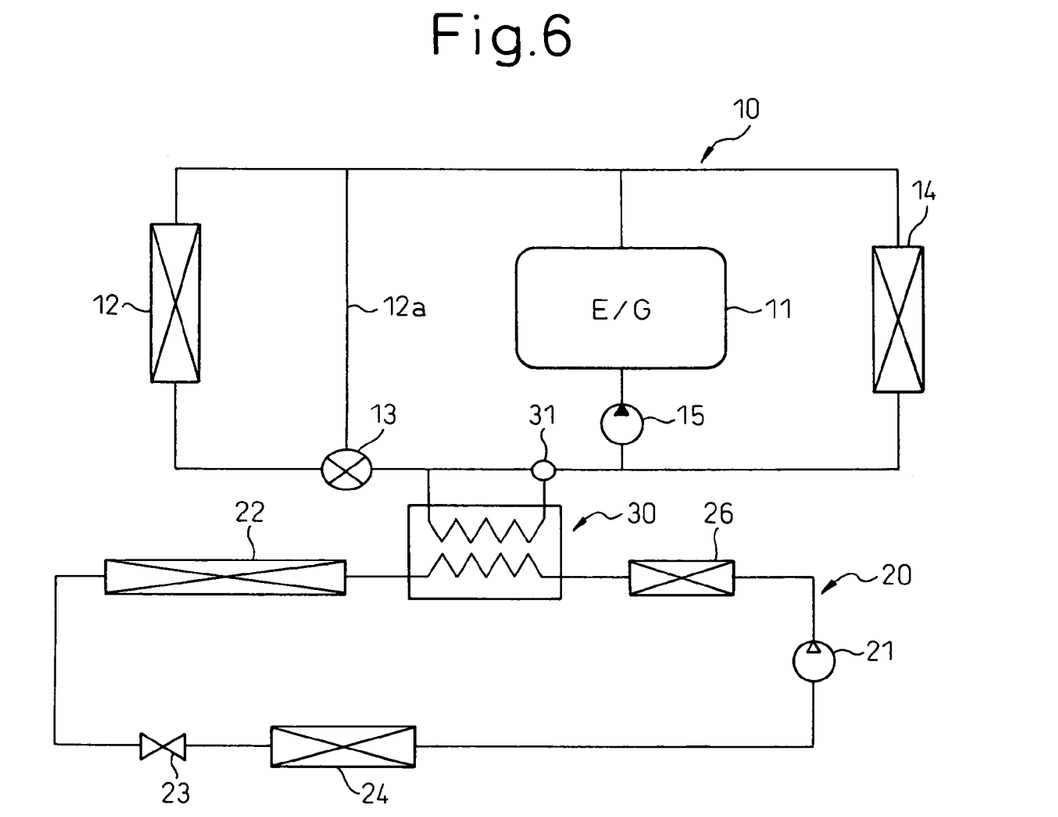
FIG. 6 is a schematic illustration of a heat control system for a vehicle according to a second embodiment of the present invention.

In the first embodiment, the liquid-phase refrigerant is guided to the water-refrigerant heat exchanger 30 by coupling the bypass 25 to a position upstream from the pressure reducer 23. Contrarily, according to this embodiment, as shown in FIG. 6, the bypass 25 is eliminated and, instead, a cooler 26 is provided for cooling the refrigerant by the heat exchange between the refrigerant fed to the water-refrigerant heat exchanger 30 and outer air.

Thereby, as the refrigerant fed into the water-refrigerant heat exchanger 30 is cooled, it is possible to increase the heat-exchanging rate in the water-refrigerant heat exchanger 30.

Also, as the refrigerant fed into the water-refrigerant heat exchanger 30 is cooled and condensed, it is possible to feed the liquid-phase refrigerant to the water-refrigerant heat exchanger 30 even if the bypass 25 is eliminated.

Accordingly, as the liquid-phase refrigerant is evaporated in the water-refrigerant heat exchanger 30 in the heat dissipation mode, it is possible to collect waste heat from the engine 11 as evaporation latent heat and to discharge the collected waste heat as condensation heat. Further, it is possible to effectively collect the waste heat from the engine 11 and discharge the collected waste heat.

Figure 7:
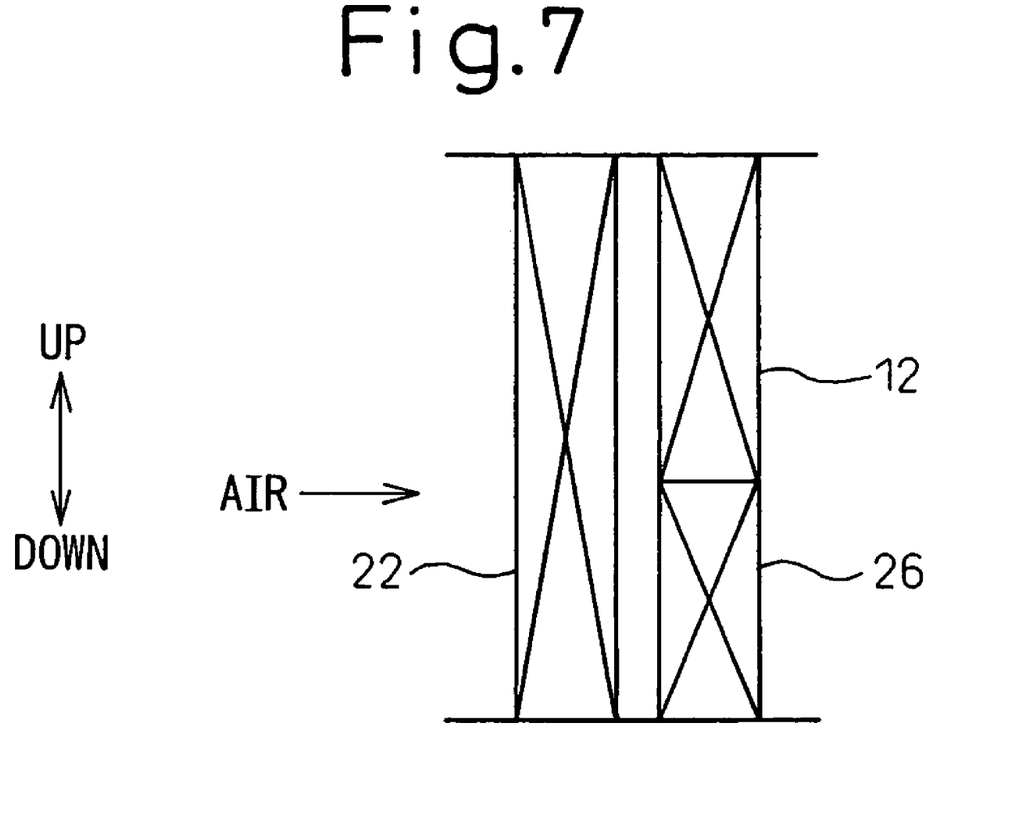
FIG. 7 is an illustration of an arrangement of a heat exchanger according to the second embodiment of the present invention.

In this regard, according to this embodiment, while another heat exchanger is necessary for the heat dissipation, it is possible to avoid the deterioration of the capacity of the vehicle for mounting the heat exchanger for the heat dissipation, as the radiator 12 can be small-sized and is arranged parallel to an air flow together with the cooler 26 as shown in FIG. 7.

While the cooler 26 is disposed beneath the radiator 12 in FIG. 7, this embodiment should not be limited thereto, but the cooler 26 may be disposed above the radiator 12.

As the refrigerant could be cooled by the cooler 26 in addition to the radiator 22 in the normal mode by arranging the cooler 26 downstream of the radiator 22 in the flowing direction of the cooling air or parallel to the flowing direction of the cooling air, it is possible to improve the heat-dissipation capacity of the vapor compression type refrigerator 20 and to reduce the power consumed in the compressor 21.

Other Embodiments

In the above-mentioned embodiments, the directional selecting valve 31 is provided for positively controlling the three modes based on the temperature Tw. However, the present invention should not be limited thereto, but the directional selecting valve 31 may be eliminated so that the refrigerant and the engine-cooling water always circulate through the water-refrigerant heat exchanger 30. Even in such a case, one of the three modes could be automatically selected in accordance with the temperature difference between the refrigerant and the engine-cooling water. In this regard, according to the first embodiment, it is necessary to control the bypass valve 25a in accordance with the temperature difference between the refrigerant and the engine-cooling water.

In the above-mentioned embodiment, the directional selecting valve 31 is provided in the cooling water circuit 10. However, the present invention should not be limited thereto, but it may be provided, for example, in the circuit of the vapor compression type refrigerator 20 to select one of the three modes. In this regard, the operation is the same as in the above-mentioned embodiment.

In the above-mentioned embodiment, the present invention has been described based on the internal combustion engine which generates heat during the operation and must be maintained within a predetermined temperature range. However, the present invention should not be limited thereto, but may be applicable to a fuel cell, a battery, an electric motor or an electric circuit such as an inverter circuit, which generates heat during the operation.

In the above-mentioned embodiment, the engine-cooling water is adopted as a medium. However, the present invention should not be limited thereto, but the medium may be engine oil or automatic transmission fluid.

In the above-mentioned embodiment, the directional selecting valve 31 is electrically controlled. However, the present invention should not be limited thereto, but the valve 31 may be mechanically operated by using, for example, the volumetric change of wax material or others.

Also, the vapor compression type refrigerator 20 may be operated while using carbon dioxide as a refrigerant and maintaining the discharging pressure of the compressor 21 at the critical pressure of the refrigerant or higher.

In the above embodiment, the expansion valve is used as the pressure-reducing means. However, the present invention should not be limited thereto, but the pressure may be reduced by a fixed throttle such as a capillary tube or that esentropically reducing the pressure of the refrigerant in a nozzle or an expander.

Also, while the heating mode and the heat dissipation mode are carried out in the above-mentioned embodiments when the starting switch of the air conditioner is ON. However, the present invention should not be limited thereto, but the heating mode and the heat dissipation mode may be carried out without relying on a state of the starting switch of the air conditioner but may be carried out simultaneously with the start of the engine 11 based on the water temperature Tw.

The invention claimed is:

1. A heat control system comprising
a heat generator in which heat is generated during operation and a temperature is maintained in a predetermined range,
a vapor compression type refrigerator having a compressor, a radiator, an evaporator and a pressure reducing means to transfer heat from a lower temperature side to a higher temperature side,
a heat exchanger for exchanging heat between refrigerant discharged from the compressor and prior to being fed into the radiator and medium for exchanging heat with the heat generator, and
a bypass connected between the outlet of the radiator and the outlet of the compressor to cause the refrigerant prior to being fed into the evaporator to flow serially through the heat exchanger and the radiator while detouring the evaporator and the compressor, wherein
the heat control system includes means for operating in a heating mode for heating the medium with the high-temperature refrigerant discharged from the compressor, and a heat dissipation mode for cooling the medium with the refrigerant discharged from the compressor and dissipating heat absorbed from the medium via the radiator, and
during the heat dissipation mode, at least a part of the refrigerant flowing out from the radiator is made to pass through the bypass.

2. A heat control system as defined by claim 1, wherein the bypass mainly guides a liquid-phase component of the refrigerant prior to being fed into the evaporator to the heat exchanger.

3. A heat control system as defined by claim 1, wherein the bypass guides the refrigerant discharged from the radiator to the heat exchanger prior to being decompressed by the pressure reducing means.

4. A heat control system as defined by claim 1, wherein the system further comprises means for controlling the heat exchange between the medium and the refrigerant in the heat exchanger.

5. A heat control system as defined by claim 4, wherein the means for controlling the heat exchange operates in the heating mode when the temperature of the heat generator is lower than a first predetermined temperature, operates in the heat dissipation mode when the temperature of the heat generator is a second predetermined temperature above the first predetermined temperature or higher, and operates in a normal mode when the temperature of the heat generator is within a range from the first predetermined temperature to the second predetermined temperature, in which the heat exchange between the medium and the refrigerant is made to stop.

6. A heat control system as defined by claim 1, wherein the heat generator is a heat engine.

* * * * *